Figure 1:
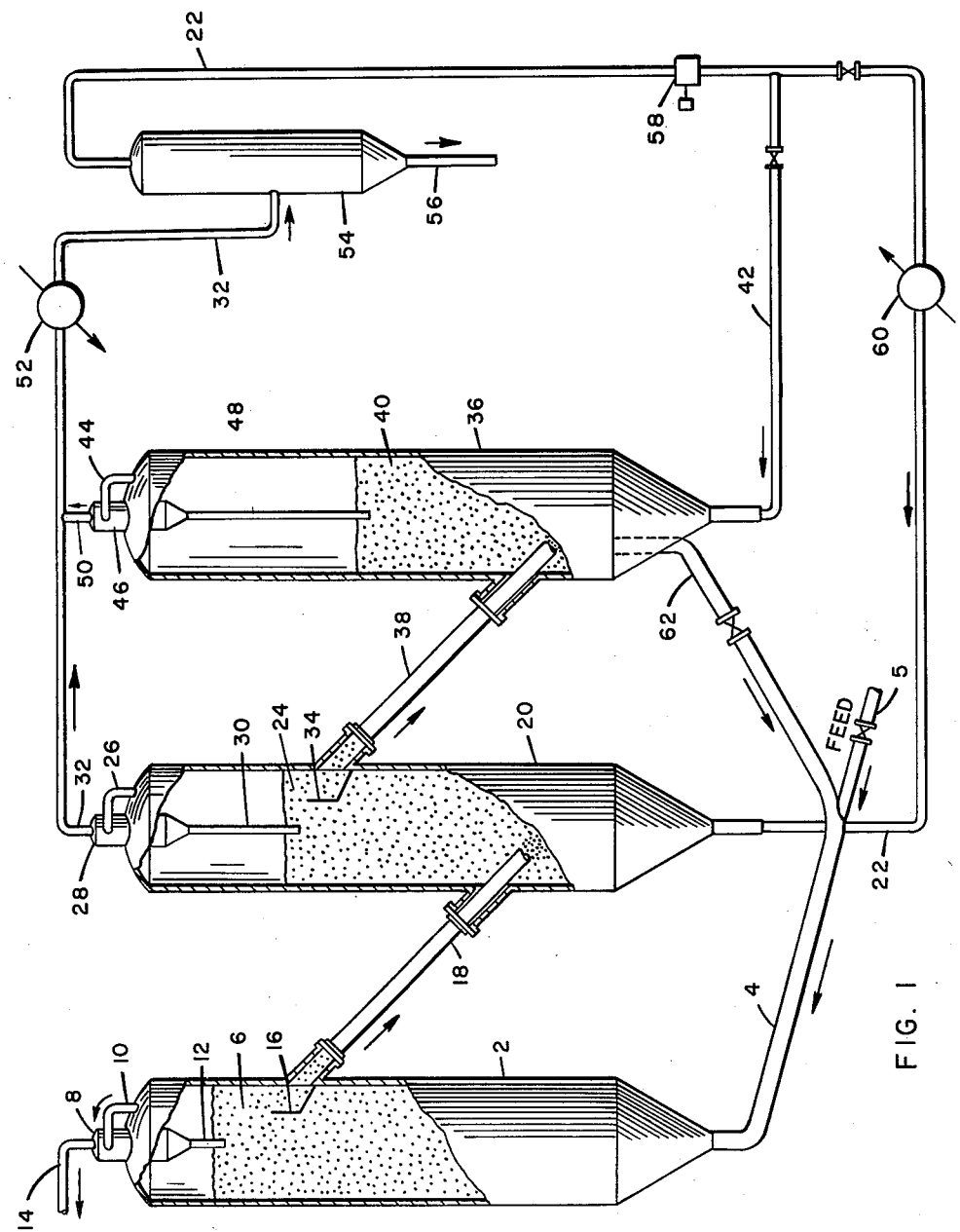

United States Patent Office 3,093,465
Patented June 11, 1963

3,093,465
METHOD FOR TREATMENT OF GASES
James E. Latta, Tulsa, Okla., assignor to Pan American Petroleum Corporation, Tulsa, Okla., a corporation of Delaware
Filed May 8, 1959, Ser. No. 811,949
7 Claims. (Cl. 55—60)

The present invention relates to a novel method for removing one or more gaseous components from a gasiform mixture of substances by the use of a fluidized bed of solids which selectively extracts such components from said mixture.

In numerous instances it is desirable to remove gaseous or vaporous compounds from gasiform mixtures. For example, natural gas, as produced, frequently contains appreciable amounts of natural gasoline hydrocarbons, as well as lighter hydrocarbons such as propane and butanes. When these higher hydrocarbons, i.e., propane, butanes, and/or natural gasoline hydrocarbons, occur in natural gas to the extent of at least about 0.1 to 0.3 gallon per 1,000 cubic feet, it is desirable to remove these materials if they can be recovered economically. This step not only depends on the efficiency of the separation system used but on the size of the gas stream to be processed. Generally such streams should be of the order of at least five to ten million cubic feet per day in order that a practical pay-out period can be realized.

Interest is currently being shown in the use of relatively small, i.e. up to forty million cubic feet per day capacity, fixed bed units packed with an adsorbent that will remove natural gasoline and $C_3$ and $C_4$ hydrocarbons from natural gas. The same equipment can be used to dehydrate natural gas. Irrespective of the particular function of the unit, it is generally set up for cyclic operation of the fixed beds of adsorbent or dehydrating material. During the adsorption phase, the feed gas is passed through the adsorbent which retains some components. Feed gas is cut out and the adsorbent bed is regenerated using heat and a stripping gas to remove the adsorbed components. Finally, the bed is cooled by stripping gas preparatory to the next adsorption phase of the process. Two or more separate fixed beds may be used to maintain continuous gas treatment. When the adsorbent material is partially saturated, the gas stream is automatically switched to a freshly regenerated bed of adsorbent material and the regeneration and cooling phases of the process carried on as previously indicated. Adsorption cycles as short as 10 minutes may be used to minimize adsorbent inventory and equipment.

While the use of fixed beds in operations of this sort serves to effectively remove one or more gaseous components from a mixture of other gases, such a method has definite disadvantages. One of the principal drawbacks lies in the valve assembly by which various streams are switched from one bed to another. Any such system with so many moving parts, not only makes for high maintenance costs but frequent malfunction oftentimes is sufficiently serious to cause a complete shutdown of the unit.

Accordingly, it is an object of my invention to avoid the above-mentioned disadvantages of fixed bed operation by employing a fluid bed system in which solid adsorbent or dehydrating material is being continuously transferred from the adsorption phase to the regeneration step to the cooling step and back to the adsorption phase. It is a further object of my invention to carry out this operation without the use of any complicated automatic valve system for use in switching the different streams to different vessels in the over-all operation.

In a first embodiment of the process of my invention, natural gas containing some moisture and natural gasoline hydrocarbons, contacts a suitable fluidized solid adsorbent in an adsorption zone and the effluent gas, free from water and natural gasoline hydrocarbons, is released from the top of the adsorption zone to sales, further processing or whatever treatment is desired. Adsorbent, laden with adsorbed water and hydrocarbons, flows as a pseudo liquid under a baffle in the adsorption zone into a separate second zone through which a hot regenerating gas circulates. The resulting hot stripped adsorbent from this second zone is also fluidized and tends to flow over a baffle or similar structure to a third zone where the material is cooled by circulating gas through it prior to flowing the cool, freshly regenerated material back to the adsorption zone. Effluent gases from the stripping and cooling zones are combined and cooled. Condensed liquids, such as hydrocarbons, are recovered and water is discarded from the system. Separator gas is compressed and recycled to the system. One portion is separately heated, for example, to 650° to 700° F., before being returned to the stripping zone. The remainder is returned to the cooling zone.

The three zones operate at substantially the same pressure. The pressure level may be from near atmospheric to about 700 to 800 p.s.i.g. The primary factors governing the choice of pressure are not the effects of pressure on adsorption-stripping but other considerations such as pressure of feed gas, pressure desired for effluent gas, condensation of desorbed liquid, etc.

An embodiment of my invention may be further illustrated by reference to FIGURE 1 in which natural gas containing an undesirable amount of moisture, for example, 0.2 percent, is introduced into vessel 2 through line 4 at a linear velocity of about 0.3 to about 2 feet per second. A fluid bed 6 consisting of a dehydrating grade of finely divided alumina, for example, 100 to 200 mesh, selectively removes the water from the natural gas. The latter, together with entrained solids pass into cyclone separator 8 via line 10 wherein the solids are separated from the dry gas and returned to the fluid bed via leg 12. Dry gas passes out the system through line 14. As the dehydration operation is going on wet or partially saturated alumina is caught in baffle 16 and sent through transfer line 18 to regeneration vessel 20. Although the major portion of the non-aqueous components of the gas stream flow out through line 14, uncombined gas or gases are also present with the particles flowing through line 18.

Spent or partially spent dehydrating agent is regenerated at temperatures of the order of 500° to about 700° F. by means of gas in that temperature range introduced through line 22. Rapid regeneration of the agent is effected by maintaining it in the form of fluid bed 24, thus permitting good contact of the suspended solids with the hot regenerative gas which likewise is introduced at a linear velocity suitable for maintaining a fluid bed, typically 0.3 to about 2 feet per second.

Hot gases consisting essentially of water vapor and uncombined gases and entrained solids are taken overhead via line 26 into separator 28 where the solids are returned to bed 24 through leg 30. Water vapor and hydrocarbons, if present, are taken off through line 32 and processed in a manner described in detail below.

The freshly regenerated dehydrating agent, typically at 550° to about 650° F., is collected in baffle 34 and sent to a third vessel 36 through transfer line 38. The hot dehydrating agent is maintained as a fluid bed 40 and cooled to about 100° F. by the introduction of cold gas at 90° F. through line 42. Fluidization in vessel 36 may be effected under essentially the same linear gas velocities as previously described.

Gas and vapor together with entrained solids are then sent through centrifugal separator 46 wherein the solids are separated and returned to the fluid bed via leg 48. The separated gas is taken off through line 50, combined with the contents of line 32 and sent through cooler 52. The resulting cooled (100° F.) steam is then introduced into separator 54 where the condensed water is allowed to accumulate and is eventually withdrawn through the system through line 56. The uncondensed gas phase is taken off overhead through line 22 and a portion of the cool gas bypassed through line 42 and forced into cooling vessel 36 by means of compressor 58. The remainder of the gas stream in line 22 is heated to about 500° to 700° F. in heater 60 and then introduced into regenerator vessel 20. Cooled alumina is continuously withdrawn from vessel 36 into transfer line 62 through which the finely divided solids are forced into line 4 by means of fresh wet natural gas feed injected through line 5 at a linear velocity of, for example, about 1 foot per second.

Figure 2:
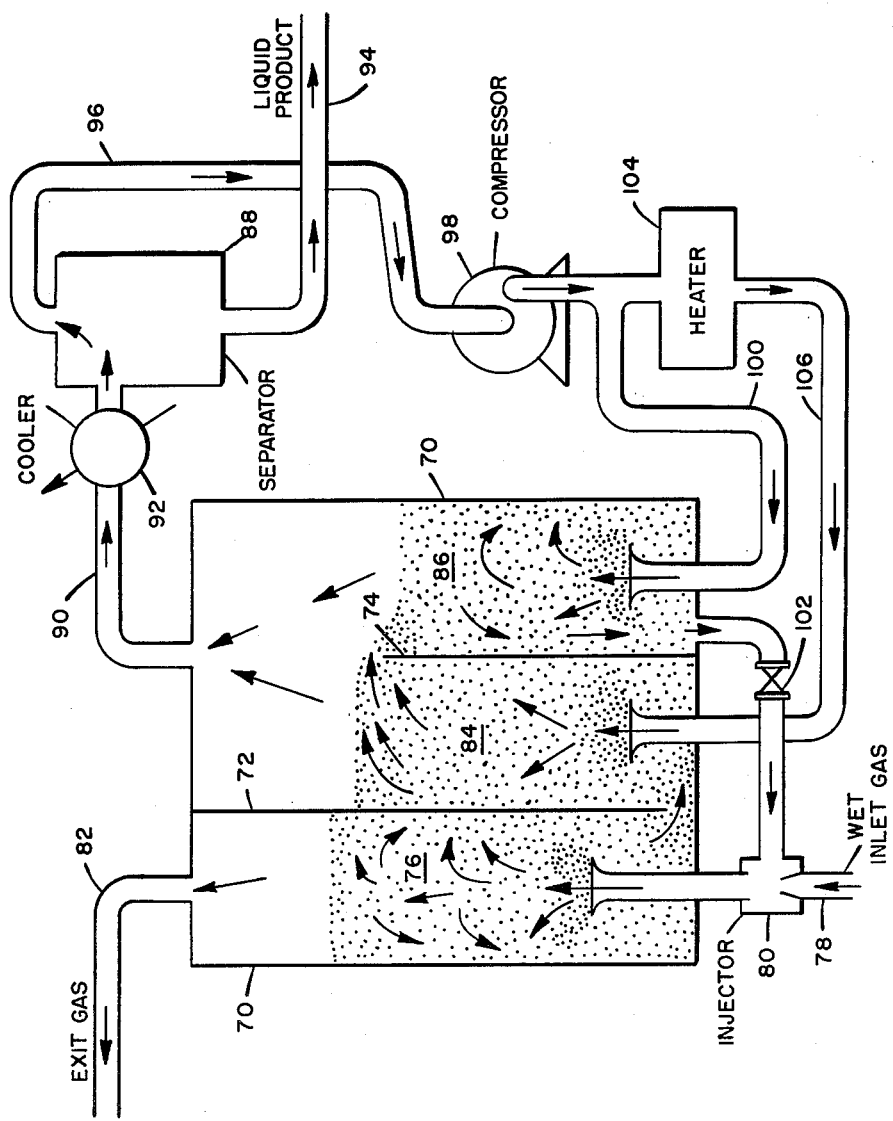

Another, and generally preferred embodiment of my invention, is shown schematically in FIGURE 2 in which a vessel 70 has incorporated therein baffle sections 72 and 74. Baffle 72, together with the opposite wall of vessel 70, define a dehydration chamber 76 containing suitable finely divided fluidized dehydrating material. A steady flow of dehydration agent through line 102 to chamber 76 via line 78 is accomplished by the aspirating action created in injector 80 resulting from the flow of a wet hydrocarbon gas in line 78. Dry gas is removed from the system through line 82. The flow of gas through line 78 and the height of the fluidized bed in chamber 76 are such that a net downflow of dehydrating agent under baffle 72 into drying or regeneration chamber 84 is maintained. A second baffle 74 separates chambers 84 and 86 and is of such height as to permit a substantially lower bed level in chamber 84 than exists in chamber 76, but which is higher than the level of the bed in chamber 86 in which hot regenerated material is cooled before returning to chamber 76.

Gases and/or vapors from both chambers 84 and 86 are collected and transferred from vessel 70 to a separator vessel 88 through line 90 and cooler 92. Liquid products, which may include both water and normally liquid hydrocarbons, are withdrawn through line 94 and further processed. The uncondensable gases taken off through line 96 are run through compressor 98. The resulting compressed gas stream is divided with a portion being sent to cooling chamber 86 via line 100 where the hot regenerated agent which has spilled over from chamber 84 is cooled. Cooled regenerated material is continuously withdrawn from chamber 86 through valved line 102; mixed with fresh wet gas and then transferred to chamber 76 by means of line 78.

The remainder of the gas coming from compressor 98 is run through heater 104 and forced into chamber 84 through line 106 where regeneration of spent dehydrating agent is effected.

By maintaining the bed levels of finely divided dehydrated agent at the relative positions indicated and the pressure substantially equal throughout the three chambers, the flow of solids is smooth and continuous.

Temperatures, pressures and gas velocities employed in carrying out my invention in accordance with the diagram shown in FIGURE 2, may be essentially the same as the ranges of these conditions listed in connection with the description of FIGURE 1.

One of the outstanding features of my invention is the fact that a continuous flow of solids is maintained in the vessels employed throughout operation of the unit. In other words, adsorbent and adsorbed components are constantly flowing to the regenerator and regenerated adsorbent is continuously flowing at a controlled rate to the cooling vessel while cool, freshly regenerated material is flowing to the adsorption vessel for a succeeding cycle. All flows of material through the system, with the exception of the one last mentioned, are by gravity. Flow of adsorbent into the adsorption or contacting vessel is motivated largely by the aspirating action of the gaseous feed flowing through line 5 into line 4. The smooth flow of finely divided solids through the system is aided by the fact that the fluid beds of the adsorption regeneration and cooling vessels are preferably maintained at successively lower levels, thereby favoring a flow of solids from the adsorption vessel to the cooling vessel. Under these conditions the adsorbent continues to flow through the system seeking to equalize fluid bed levels.

By proper selection of finely divided adsorbent materials for the fluid beds, one or more components of a gasiform stream can be selectively removed. For example, both water and higher hydrocarbons can be removed from a natural gas stream by the process of my invention, using a fluid bed composed of finely divided silica gel; the water alone could be removed by the use of finely divided alumina; the higher hydrocarbons could be selectively removed by the use of an adsorbent, such as activated charcoal. Numerous other materials well known to the art may be used to extract components of gasiform streams in accordance with my invention.

In processes involving removal of both water and higher hydrocarbons, i.e. $C_3$ and heavier hydrocarbons, from the feed to the adsorption or contacting tower, both the water and hydrocarbon may be removed from the adsorbent by means of heat, collected, cooled, and the resulting hydrocarbon and aqueous layers separated. The stream of uncondensables simultaneously obtained, is compressed, divided and used as a coolant and as a regenerating gas as previously described.

The word "gaseous" is intended to refer to either gaseous or vaporous components or may imply mixtures of the two when reference is made to more than one component.

I claim:

1. In a process for the removal of a gaseous component from a gasiform stream containing said component, the improvement which comprises injecting said stream into a first zone containing a bed of finely divided particles active to combine selectively with said component, said stream being injected at a linear velocity sufficient to fluidize said particles but insufficient to prevent a net downflow of said particles, injecting hot gas at a temperature of not more than about 700° F. into a second zone containing a fluidized bed of particles from said first zone, the level of the bed in said first zone being higher than the level of the bed in the second zone, continuously withdrawing said particles and adsorbed component from said first zone and transferring this mixture to the second zone by means of the pressure due to the difference in levels of the two beds, conducting the operation in the second zone so that the hot freshly regenerated particles therein tend to spill over into a third zone into which relatively cool gas consisting essentially of uncondensables present in said gasiform stream is injected at a rate such that there is a net downflow of said particles in said third zone, the fluidized bed in the third zone having a level lower than the bed level in the second zone, continuously transferring the resulting cooled regenerated particles from the third to the first zone via an additional charge of said gasiform stream, the pressure in all three zones being substantially the same, withdrawing a gaseous stream from said first zone free of said component and removing the entire quantity of this stream from the system, withdrawing and combining the gaseous streams from the second and third zones, cooling the resulting combined gaseous stream and separating the uncondensables therefrom, dividing said uncondensables into two streams, using one of said two streams as the fluidizing gas in the third zone, and heating the other of said streams to a temperature of not more than about 700° F. and using it as the fluidizing gas in said second zone.

2. In a process for the removal of a gaseous component from a gasiform stream containing said component, the improvement which comprises injecting said stream into a first zone containing a bed of finely divided particles active to combine selectively with said component, said stream being injected at a linear velocity sufficient to fluidize said particles, withdrawing a gaseous stream from said first zone substantially free of said component and removing the entire quantity of this stream from the system, continuously withdrawing said particles and adsorbed component from said first zone and transferring this mixture by gravity flow to a second zone where said particles are subjected to fluidizing conditions at a temperature of not more than about 700° F. to liberate said component from said particles, the level of the bed in said second zone being lower than that in said first zone, continuously removing hot freshly regenerated particles from said second zone by gravity flow and introducing them into a third zone where they are again subjected to fluidizing conditions at gas injection rates insufficient to prevent a net downflow of said particles, withdrawing combined gaseous streams from said second and third zones and cooling the resulting stream to a temperature sufficiently low to produce a condensate, dividing the uncondensables from said resulting stream into two streams, injecting one of said two streams into said third zone as a fluidizing gas, heating the other of said two streams to a temperature of not more than about 700° F. and using it as a fluidizing gas in said second zone, and continuously transferring cool regenerated particles from said third zone to said first zone via an additional charge of said gasiform stream.

3. The process of claim 1 in which the bed of finely divided particles is composed of silica gel.

4. The process of claim 1 in which the finely divided particles consist essentially of a mixture of activated carbon and alumina.

5. The process of claim 1 in which the bed of finely divided particles is composed of alumina.

6. The process of claim 1 in which the gasiform stream is natural gas.

7. In a process for the removal of a gaseous component from a gasiform stream containing said component, the improvement which comprises injecting said stream into a first zone containing a bed of finely divided particles active to combine selectively with said component, said stream being injected at a linear velocity sufficient to fluidize said particles, withdrawing a gaseous stream from said first zone substantially free of said component and removing the entire quantity of this stream from the system, continuously withdrawing said particles and adsorbed component from said first zone and transferring this mixture by gravity flow to a second zone where said particles are subjected to fluidizing conditions at a temperature of not more than about 700° F. to liberate said component from said particles, said second zone being horizontally displaced from said first zone with the level of the bed in said second zone being lower than that in said first zone, continuously removing hot freshly regenerated particles from said second zone by gravity flow and introducing them into a third zone horizontally displaced from said second zone where said particles are again subjected to fluidizing conditions at gas injection rates insufficient to prevent a net downflow of said particles, the level of the fluidized bed in said third zone being lower than that in said second zone, withdrawing combined gaseous streams from said second and third zones and cooling the resulting stream to a temperature sufficiently low to produce a condensate, dividing the uncondensables from said resulting stream into two streams, injecting one of said two streams into said third zone as a fluidizing gas, heating the other of said two streams to a temperature of not more than about 700° F. and using it as a fluidizing gas in said second zone, and continuously transferring cool regenerated particles from said third zone to said first zone via an additional charge of said gasiform stream.

References Cited in the file of this patent

UNITED STATES PATENTS

| | | |
|---|---|---|
| 2,522,426 | Black | Sept. 12, 1950 |
| 2,527,964 | Robinson | Oct. 31, 1950 |
| 2,823,764 | Miller | Feb. 18, 1958 |
| 2,861,651 | Miller | Nov. 25, 1958 |
| 2,880,818 | Dow | Apr. 7, 1959 |